(12) United States Patent
Bayes et al.

(10) Patent No.: US 6,400,411 B1
(45) Date of Patent: Jun. 4, 2002

(54) SYSTEM AND PROCESS FOR MAINTAINING CONSISTENT VIDEO LEVELS WHEN DIGITIZING VIDEO SIGNALS USING DIFFERENT VIDEO CAPTURE DEVICES

(75) Inventors: Stephen A. Bayes, Brighton; Donald E. Nelsen, Winchester, both of MA (US)

(73) Assignee: Avid Technology, Inc., Tewksbury, MA (US)

( * ) Notice: Subject to any disclaimer, the term of this patent is extended or adjusted under 35 U.S.C. 154(b) by 0 days.

(21) Appl. No.: 09/006,329

(22) Filed: Jan. 13, 1998

(51) Int. Cl.$^7$ ................................................ H04M 1/12
(52) U.S. Cl. ........................ 348/572; 348/176; 348/722
(58) Field of Search ................................ 348/572, 176, 348/175, 722, 222, 228, 231, 262; 358/505, 445; 386/4, 34, 40, 52, 124

(56) References Cited

U.S. PATENT DOCUMENTS 5,544,240 A * 8/1996 Warren ........................ 382/270
5,552,890 A * 9/1996 Nanna et al. ................ 356/369
5,760,918 A * 6/1998 Janiska et al. .............. 358/445

* cited by examiner

*Primary Examiner*—Victor R. Kostak
(74) *Attorney, Agent, or Firm*—Peter J. Gordon, Esq.

(57) ABSTRACT

The invention overcomes the need to adjust the video level settings of different video capture devices for each source by saving each setting as a difference between the actual setting and a default setting when digitizing source material. These saved differences are called differential settings. An actual setting for another capture device that provides consistent video levels when digitizing the same source may be derived from both the differential setting obtained when digitizing using the first capture device and the default setting of the other capture device. As a result, source material is mapped to consistent internal digital levels when used on the different devices. Accordingly, video characteristics such as gain, black, saturation and hue can be maintained correctly regardless of the unique settings due to manufacturing and calibration tolerances of the different video capture devices.

20 Claims, 7 Drawing Sheets

FIG. 2

(PRIOR ART)

| Video Tape Number | Video Gain Setting | Video Black Setting | Video Saturation Setting | Video Hue Setting |
|---|---|---|---|---|
| 1 | 41 | 37 | 20 | 68 |
| 2 | 41 | 38 | 21 | 67 |
| 3 | 42 | 37 | 20 | 39 |
| 4 | 39 | 37 | 19 | 45 |
| 5 | 35 | 39 | 22 | 47 |

FIG. 4A

| Video Tape Number | Differential Gain Setting | Differential Black Setting | Differential Saturation Setting | Differential Hue Setting | Video Board Type |
|---|---|---|---|---|---|
| 1 | 2 | -1 | 0 | 18 | I |
| 2 | 2 | 0 | 1 | 17 | I |
| 3 | 3 | -1 | 0 | -11 | I |
| 4 | 0 | -1 | -1 | -5 | I |
| 5 | -4 | 1 | 2 | -3 | I |

FIG. 4B

| Tape Number | Gain Setting on Device 1 | Default Gain Setting on Device 1 | Differential Gain Setting for Tape | Default Gain Setting on Device 2 | Gain Setting on Device 2 |
|---|---|---|---|---|---|
| 1 | 41 | 39 | 2 | 40 | 42 |
| 2 | 41 | 39 | 2 | 40 | 42 |
| 3 | 42 | 39 | 3 | 40 | 43 |
| 4 | 39 | 39 | 0 | 40 | 40 |
| 5 | 35 | 39 | -4 | 40 | 36 |

SYSTEM AND PROCESS FOR MAINTAINING CONSISTENT VIDEO LEVELS WHEN DIGITIZING VIDEO SIGNALS USING DIFFERENT VIDEO CAPTURE DEVICES

FIELD OF THE INVENTION

The invention relates to processing of video signals and more particularly for systems and methods for maintaining consistent video levels when digitizing video signals using different video capture devices.

BACKGROUND OF THE INVENTION

In the production of video programs, such as television programs and motion pictures, it is common for source material to be digitized with two different video capture devices. For example, one editing system with one video capture device may be used to make a rough cut of the program, while another, usually more sophisticated, editing system with a different video capture device may be used to finish the project. An editing system also may be upgraded to have a new video capture device. In some cases, the video program is produced in two different locations, using two editing systems with two different video capture devices. Sometimes two different video capture devices in the same location are used by systems which perform different tasks. Multiple video capture devices may be used to digitize video for storage on a shared server, from which playback may occur.

A video capture device digitizes analog video signals to provide digital video information. Video signals must have certain levels for various characteristics in order to comply with broadcast and recording industry standards for image quality. For a composite analog signal, these characteristics are gain (contrast), black (brightness or offset), saturation and hue. For a component analog signal, these level settings typically include luma gain (contrast) and luma black (brightness or offset) settings, and gain settings for the red and blue color difference components. A video capture device typically has a mechanism for adjusting settings that control these video levels. These settings initially are preset for several standards such as PAL and NTSC by the manufacturer of the video capture device so that each video capture device provides a generally uniform response. A user also may change the preset settings. These preset settings are called default settings. These settings may be adjusted during digitization of source material, by an editor or automatically, to ensure compliance with industry standards. These adjustments usually are required for each source and result in different settings for each source. It is common to save the adjusted video level settings used to digitize each source in order to reuse them if the source is redigitized using the same video capture device.

Since each video capture device has unique settings due to manufacturing and calibration tolerances, the particular settings for a source digitized on one video capture device may not provide the same video characteristics if used on a different video capture device to digitize the same source. In particular, the internal digital levels provided by the video capture devices in response to certain input settings may not be consistent with each other. For example, for one set of video level settings, the color or brightness of the digitized source material generated by one video capture device may appear correct while the color or brightness of redigitized source material generated by another video capture device with the same video level settings may appear incorrect.

Different types of video capture devices also may have different resolutions or ranges for representing a setting. For example, the gain setting on one type of device may have a range from 0 to 63 while the gain setting on another type of device may have a range from 0 to 255. In such a case, a gain setting for one type of device simply cannot be used directly on devices of another type.

For these reasons, when two video capture devices are used to produce a video program, each video capture device typically must be adjusted for each source, potentially incurring significant costs.

SUMMARY OF THE INVENTION

The invention overcomes the need to adjust the video level settings of different video capture devices for each source by saving each setting as a difference between the actual setting and a default setting when digitizing source material. These saved differences are called differential settings. An actual setting for another capture device that provides consistent video levels when digitizing the same source may be derived from both the differential setting obtained when digitizing using the first capture device and the default setting of the other capture device. As a result, source material is mapped to consistent internal digital levels when used on the different devices. Accordingly, video characteristics such as gain, black, saturation and hue can be maintained correctly regardless of the unique settings due to manufacturing and calibration tolerances of the different video capture devices.

Accordingly, in one aspect, video is digitized using a first video capture device such that consistent levels for characteristics of the video are obtained when the video is digitized on a second video capture device. The first video capture device has default settings for the video characteristics. These default settings may be adjusted and the video sequence is digitized using the adjusted settings. Video level settings are stored as differential settings with respect to the default settings. The differential settings may be determined by comparing the adjusted video level settings to the default settings. The video level settings of the second video capture device may be set using the differential settings and default settings for the second video capture device to digitize the video.

In another aspect, video is redigitized so that substantially the same characteristics of the video as digitized with a first video capture device are obtained when using a second video capture device. Differential settings with respect to default settings for the first video capture device are obtained. The video settings of the second video capture device are derived from the differential settings and default settings for the second video capture device. The video sequence is then redigitized using the second video capture device.

In order to set the video settings on the second video capture device, the default settings for the second video capture device may be read. The differential settings may be added to the default settings for the second video capture device to obtain a sum. The video level settings of the second video capture device may be set to the sum of the differential and default settings. In some cases, the differential settings may be scaled according to any difference in range of video level settings between the first video capture device and the second video capture device. The scaled differential settings are added to the default settings of the second video capture device to obtain the new settings.

BRIEF DESCRIPTION OF THE DRAWINGS

In the drawings,

FIG. 2 is an example of video level settings that may be stored by the video production system of FIG. 1;

FIG. 4A is an example of differential video level settings saved by a first video capture device, and reused by a second video capture device of the video production system of FIG. 3;

FIG. 4B is an example of video level settings derived for a second video capture system based on differential video level settings from a first video capture system and default settings of the second video capture system;

DETAILED DESCRIPTION

The present invention will be more completely understood through the following detailed description which should be read in conjunction with the attached drawing in which similar reference numbers indicate similar structures.

Figure 1:
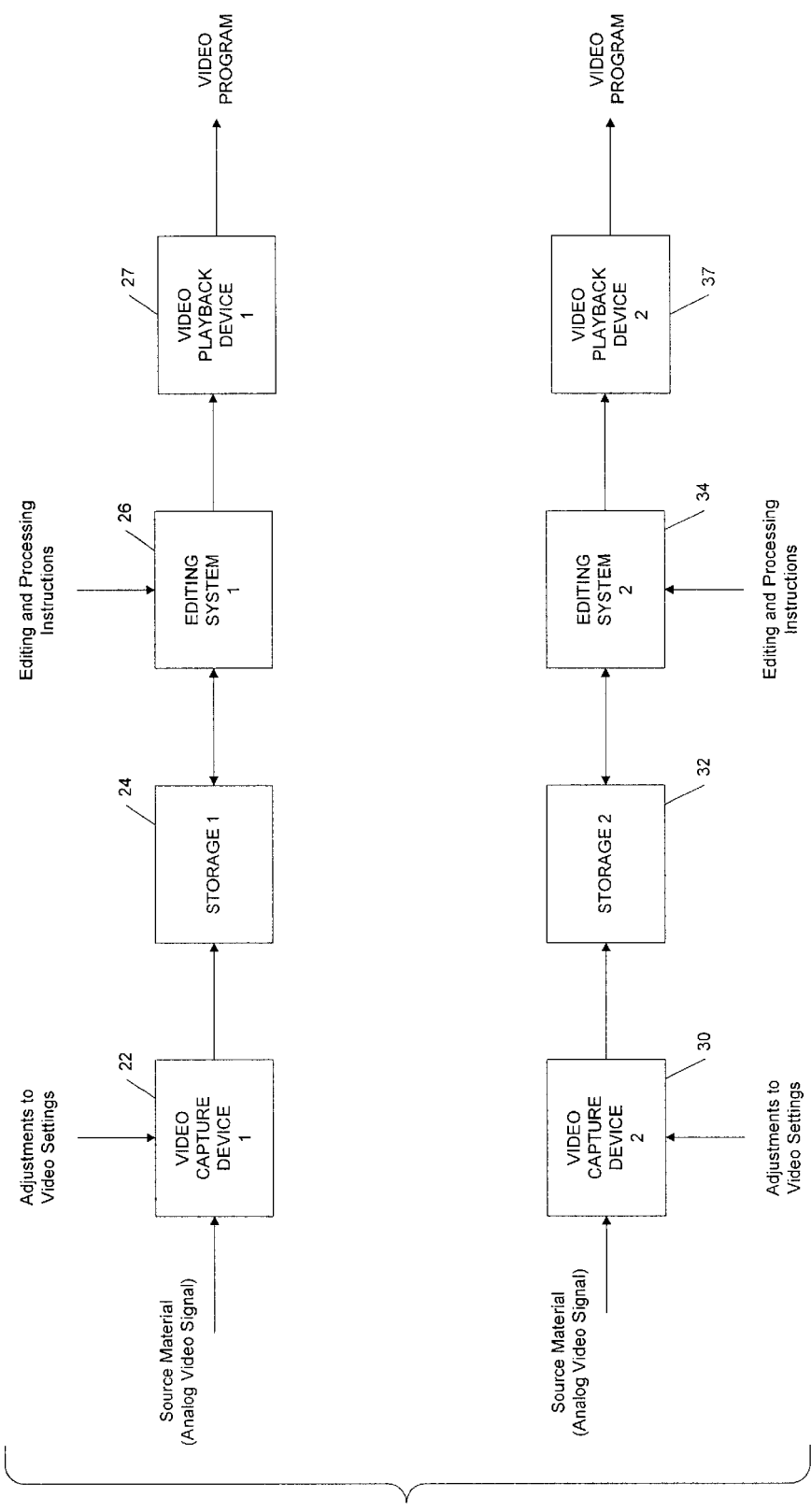
FIG. 1 is a block diagram of a conventional video production system.

FIG. 1 illustrates a conventional video production system 20 that produces a video program from source material. The system 20 includes a first video capture device 22 that receives source material, typically in the form of an analog video signal. The system 20 further includes storage 24 coupled to the video capture device 22. The video capture device 22 digitizes the source material and stores the digitized source material in storage 24. The system further includes an editing system 26 coupled to the storage 24. The editing system 26 edits and processes the digitized material stored in storage 24, based on editing and processing instructions from a user of the system, to create a video program which may be viewed using a video playback device 27.

The system 20 further includes a second video capture device 30 coupled to storage 32, which is coupled to a second editing system 34. The video capture device 30 receives the source material, digitizes the source material, and stores the digitized source material in storage 32. Then, the editing system 34 is used to edit and process the digitized source material, based on editing and processing instructions from an editor, to create another version of the video program, which may be viewed using a video playback device 37. Storage 24 and 32 may be shared by the video capture devices 22 and 30, and by editing systems 26 and 34.

The first editing system may be used to create a rough version of the video program, and the quality of the edited program generally is not suitable for broadcast. The rough version in general is high compressed, may be lacking in special effects or may have audio that has not been processed. The second editing system may be used to generate a broadcast quality version of the video program that includes special effects and better quality audio, for example, than the rough version of the video program.

As illustrated in FIG. 1, the video capture devices 22 and 30 of the conventional system 20 initially load default video level settings that were preset, either by the user or by the manufacturer. The editor makes adjustments to these video level settings and then digitizes the source material. The source material may need to be redigitized using the video capture device associated with each editing system to be used. For each video capture device used, adjustments may be made by the editor to the default video level settings.

The adjustments to the video level settings and the editing and processing instructions may be provided to the video production system using one or more conventional input devices. For example, the video level settings may be adjusted by using a mouse to operate dialogue buttons or bars shown on a display monitor. In particular, the buttons or bars may be moved by mouse signals such that a waveform and vectorscope on the display monitor indicate that the internal digital levels and resulting output levels conform to industry standards.

FIG. 2 illustrates, by way of example, video level settings for a source that may be used by the video capture device 22. These settings generally may be reused by the video capture device 30 to redigitize the same source but the settings will produce some error. Each video tape may have its own unique set of video level settings. For example, video tape 1 may have a gain setting of 41, a black setting of 37, a saturation setting of 20, and a hue setting of 68. If the default settings of the second video capture device 30 were replaced by the video level settings stored for the tape when the tape was digitized using the first video capture device 22, the corresponding video levels generated by capture device 30 likely would not be the same as those produced by capture device 22.

There are instances, other than in a system as shown above, where a source is digitized using one video capture device and then is redigitized using another video capture device. For example, a video capture device in an editing system may be upgraded. In some cases, the video program is produced in two different locations, using two different video capture devices. Sometimes two different video capture devices in the same location are used to perform different tasks. Multiple video capture devices may be used to digitize video data for storage on a shared server, from which playback may occur. In each of these cases, settings used on one capture device may provide video levels that are different from video levels produced by another capture device using the same settings. In addition, if the types of the capture devices are different, and even if video levels are identical among different devices of one type, the settings for a device of one type may have a different range or a different mapping to video levels than the settings on a device of another type. In each of these cases in the prior art, an editor typically must readjust the video settings on each device used, for each source.

The invention overcomes the need to adjust the video level settings of different video capture devices to redigitize each source by storing differential settings representing the video level settings used when digitizing the source material on one capture device. The actual settings to be used on another device may be derived from the differential settings obtained on a first device and the default settings read from the other device. As a result, source material is mapped, with less effort, to consistent internal digital levels by different video capture devices. Accordingly, video characteristics, such as gain, black, saturation and hue, can be maintained correctly regardless of the variations among the different video capture devices. Such differential settings may be stored for each mode in which the device may operate, such as NTSC or PAL.

Figure 3:
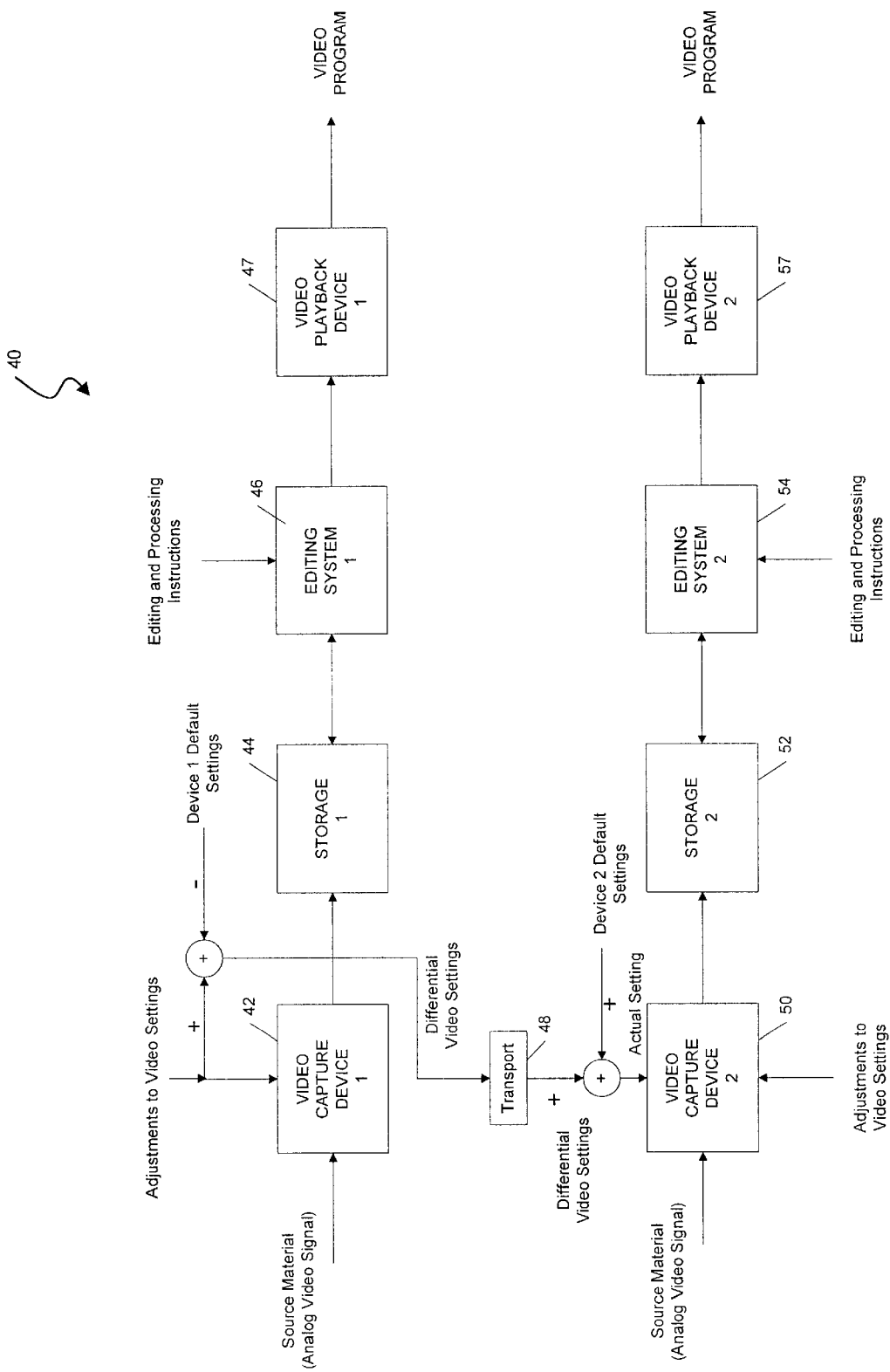
FIG. 3 is a block diagram of one embodiment of a video production system utilizing the invention.

FIG. 3 illustrates one embodiment of a video production system 40 utilizing the present invention. The video production system 40 includes a video capture device 42 that receives source material, typically in the form of an analog video signal. The system 40 further includes storage 44 coupled to the video capture device 42, and an editing system 46 coupled to storage 44. The video capture device 42 digitizes the source material, and stores the digitized source material in storage 44. The editing system 46 is used to edit and process the digitized source material, based on editing and processing instructions from a user, to create a video program that may be played back using a video playback system 47.

The system 40 further includes a second video capture device 50 that may redigitize the source material. Storage 52 is coupled to the video capture device 50, and stores the redigitized source material. A second editing system 54 is coupled to the storage 52. The second editing system may be used to edit and process the redigitized source material, based on editing and processing instructions from a user, to create a video program that may be played back using a video playback system 57. Storage 44 and 52 may be shared by the video capture devices 42 and 50, and by editing systems 46 and 54.

The first video capture device 42 digitizes the source material based on adjustments to its default video settings. Rather than storing the actual video level settings, the differential video level settings (with respect to default settings) are saved and may be reused by the second video capture device 50. The actual settings to be used on the second video capture device may be derived from the differential settings obtained from the first video capture device and the default settings read from the second video capture device.

The differential video level settings may be transferred from the first capture device 42 to the second capture device 50 through the transport 48. The transport 48 may be a computer network that conveys the differential video level settings from the capture module 42 to the capture module 50 as signals (e.g., optical, electrical or radio). The two editing systems may be geographically diverse and may or may not be connected by a computer network. Accordingly, transport 48 may involve transferring the differential video level settings from the capture module 42 to the capture module 50 using a computer diskette, or some other manually portable recording medium.

FIG. 4A illustrates, by way of example, information that may be saved using the first video capture device 42, and reused by the second video capture device 50, in one embodiment of the invention. The information includes the differential video level settings and a type of the video capture device that was used. This information is stored for each source of video data. For example, video tape #1 has an differential gain setting of 2, and differential black setting of −1, an differential saturation setting of 0, and an differential hue setting of 18. Furthermore, video tape #1 used these differential settings when digitizing source material on a video capture device of a type I. It should be understood that FIG. 4A merely represents the kind of data stored and not the structure of stored data. The data may be stored for each tape and may be stored along with other information describing the contents of a file of video data captured from the tape, or with a file or data structure representing the video program edited using the source material.

There a several ways to derive the actual video level settings for the second video capture device from the differential settings obtained from the first video capture device and the default settings of the second video capture device. In the most general case, each capture device can be defined by a function that maps video settings to video levels and that has a slope. Since the default settings of two capture devices should correspond to the same known video level, the problem of deriving the appropriate setting on the second device can be considered as an initial value problem, for which there are several numerical solutions. See for example, *Elementary Differential Equations*, by C. H. Edwards, Jr., and D. E. Penney, Prentice-Hall, 1985, Chapter 6, which is hereby incorporated by reference.

In the simplest case, where the two capture devices are of the same type, the slopes of their setting-to-level functions are nearly equal. In this case, the actual setting for the second capture device may be determined by adding the differential setting obtained using the first capture device to the default setting of the second capture device. An example of the settings obtained using this embodiment is shown in FIG. 4B. For each tape 1–5, the actual gain settings on device 1 are shown. Assuming the default gain setting on the first device was 39, the differential gain settings shown in FIG. 4A were derived. Assuming the default gain setting on the second device was 40, the actual gain settings for tapes 1–5 are computed by adding the differential gain settings to the default gain setting of 40 for the second device.

A more difficult case occurs where the devices are of different types and are likely to have substantially different slopes. In such a case, the differential setting is scaled and then added to the default setting. In particular, the actual setting (Xnew) for the second device may be derived using the slopes of the two devices (a1 and a2), the differential setting (DX1) from the first device and the default setting of the second device (Xset2). Using the first two terms of a Taylor series, the actual setting may be derived using the following formula:

$$Xnew = a1/a2 * DX1 + Xset2$$

In some cases, a derived actual setting may be outside of the useful linear range of settings of the device. In such a case, the derived setting may be limited by the limits of the linear range of the device.

This approximation is substantially accurate when, for a given type of device, the slope of the setting-to-value function only varies over a small percentage range among devices. The function also should be approximately linear in the vicinity of the default setting. For two different types of devices, the quotient of the slopes of the setting-to-value functions (a2/a1) also should not vary significantly around a mean value.

Figure 5:
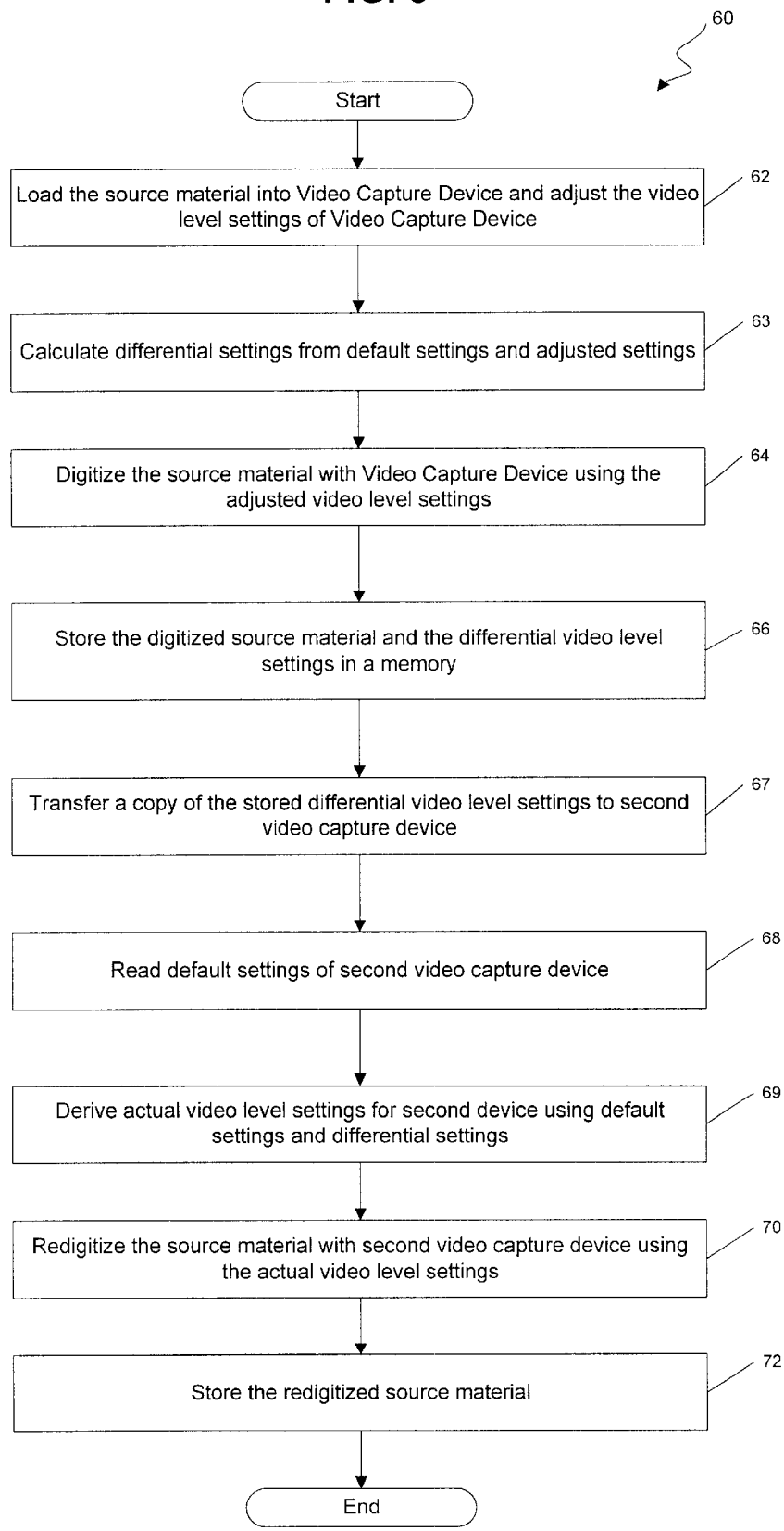
FIG. 5 is a flowchart describing an operation of the video production system of FIG. 3.

One embodiment of the invention will now be described in connection with FIG. 5, which illustrates a flow diagram 60 describing operation of the video production system 40. In step 62, source material, typically in the form of an analog video signal, is provided to the first video capture device 42. The video level settings are adjusted by a user so that the analog video signal maps to appropriate internal digital levels. When the settings have been adjusted, differential settings are calculated from the default settings and the adjusted settings in step 63. In step 64, the video capture device digitizes the analog video signal using the adjusted video level settings. In step 66, the digitized source material and the differential video level settings are stored in memory, such as the storage 44. An editor may create a rough version of a video program using the digitized source material. When the editor creates a final version of the video program, the source material may need to be digitized for use on a second video system. In step 67, a copy of the stored differential video level settings is transferred to the second video capture device 50 through the transport 48. The default settings are read from the second video capture device in step 68. Actual video level settings for the second device then are derived in step 69 using the default settings of the second device and the differential settings obtained using the first device, in a manner as described above. In step 70, the video capture device 50 redigitizes the analog video signal using the actual settings. In step 72, the redigitized source material may be stored in memory, such as storage 52.

As an example, assume the second video capture device has a gain setting of 39, a black setting of 38, a saturation setting of 20, and a hue setting of 50, as its factory preset settings. Video tape 1 has an differential gain setting of 2, an differential black setting of −1, an differential saturation setting of 0, and an differential hue setting of 18 on a first device of the same type. Accordingly, the second video capture device will have, as actual settings, a gain setting of 41, a black setting of 37, a saturation setting of 20, and a hue setting of 68 for video tape 1. These actual settings are used by the second video capture device during redigitization of the source material from video tape 1.

Figure 6:
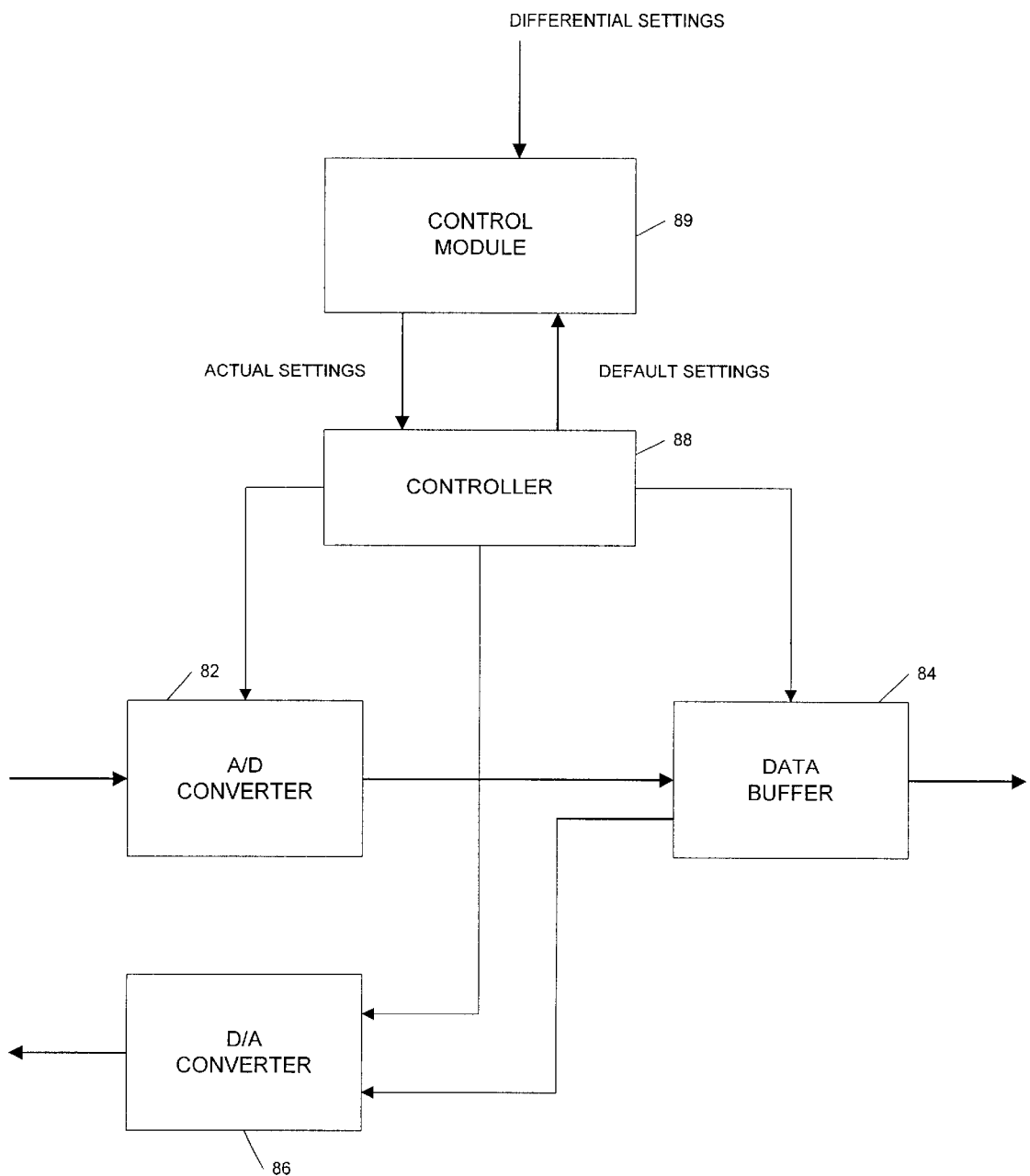
FIG. 6 is a block diagram of a video capture device of the video production system of FIG. 3.

FIG. 6 illustrates one type of video capture device that may be used with the present invention. This kind of video capture device uses an analog to digital (A/D) converter 82 which receives analog video signals and outputs digital video information to a data buffer 84. Similarly, a digital to analog (D/A) converter 86 receives digital video information from the data buffer 84 and outputs an analog video signal during playback. A controller typically is used to control the processing by the A/D and D/A converters and the data buffer. The A/D and D/A converters may be data value controlled, in response to a digital input. There are generally three ways in which the video levels may affect the internal digital levels of the capture device as produced by the A/D converter. In one type of A/D converter, the settings may adjust the power supply to a quantization circuit where the analog signal remains constant. In another kind of A/D converter, the gain and offset of the analog signal may be adjusted. In yet another kind of device, the settings may perform adjustments in the digital domain after quantization. Different kinds of converters may be present in a single video capture device.

A video capture device, such as shown at FIG. 6, may have about a two percent variation from device to device in video levels produced for the same settings for the A/D converter. The settings may be controlled indirectly through commands to the controller 88 or directly via inputs to the video capture device, which could be controlled by a computer program executed on a computer connected to the video capture device. The default settings may be read from the video capture device either directly or via the controller 88 by a control module 89, which may be implemented as a computer program. The control module may receive inputs from a user to adjust these settings. The actual settings, perhaps adjusted by the user, may be applied to the video capture device either directly or via the controller 88. The control module may determine and store differential settings by determining the difference between the default settings read from the device and the actual settings ultimately applied to the device. The differential levels may be stored in association with the digital video information of a given source, perhaps in a same or separate file or in a database that associates source material with these values and/or other information about the source material.

Different types of video capture devices also may have different ranges for the video level settings. For example, the gain setting for one type of video capture device may have a range from 0 to 63. However, the gain setting for a second type of video capture device may have a range from 0 to 255. In order to account for this difference the differential settings may be scaled before reusing them if the ranges of the video capture devices are different. In the above example, since the range for the gain setting is four times as large for the second video capture device, a differential gain setting of 2 on the first video capture device is scaled to an differential gain setting of 8 before being reused by the second video capture device. Accordingly, the second video capture device adds the scaled differential gain setting of eight to the default gain setting (e.g., 156) to obtain an actual gain setting (e.g., 164) for use during redigitization.

Figure 7:
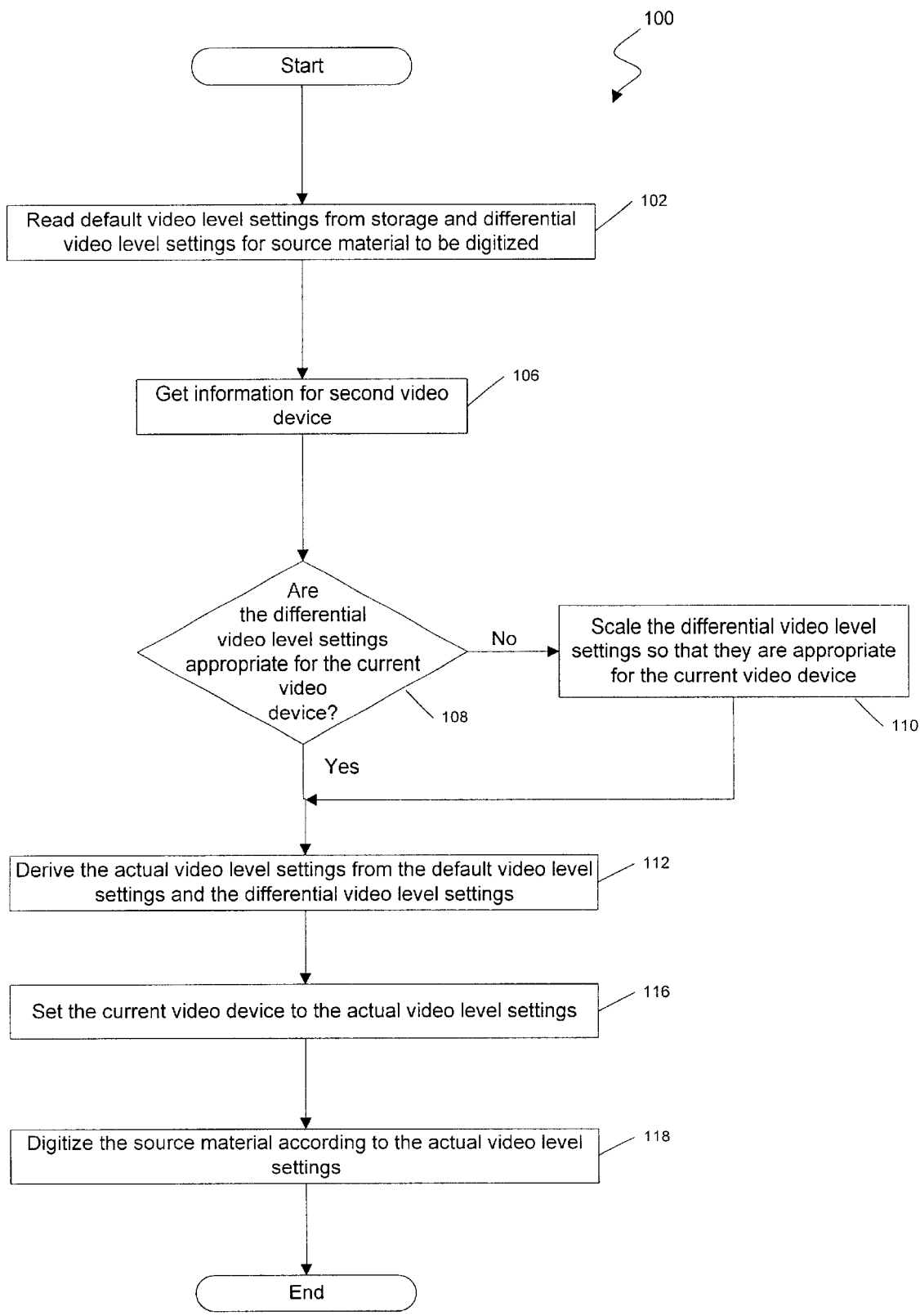
FIG. 7 is a flow chart describing an operation of the video capture device of FIG. 6.

FIG. 7 illustrates a flow diagram 100 describing how a video capture device, such as shown in FIG. 6, is programmed to redigitize source material. In step 102, the default settings of the second video capture device are read. Differential settings from the first video capture device corresponding to source material to be redigitized also are read along with information about the range and resolution of the device. Information including the range and resolution for the second video device is obtained in step 106. The system determines whether the differential video level settings used on the first video capture device are appropriate for the second video capture device, i.e., correspond to the same range and resolution as the first video capture device. If these settings are not appropriate, the differential video level settings are scaled so that they are appropriate for the second video capture device in step 110. After such scaling, or if the differential video level settings are appropriate for the second video capture device, the actual video level settings for the second video capture device are derived from the differential video level settings and the default video level settings. In step 116, the second video capture device is set to the actual settings. In step 118, the second video capture device then may be used to digitize the source material according to the actual video level settings.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art. For example, differential settings for timing settings and timing parameters, such as genlock settings and horizontal and vertical picture adjustment settings, also may be stored. These and other embodiments are contemplated as falling within the scope of the invention as defined by the appended claims and equivalents thereto.

What is claimed is:

1. A process for digitizing video from a source using a first video capture device to support maintenance of consistent levels of video characteristics when the source is redigitized on a second video capture device, comprising the steps of:

adjusting video level settings having default settings on the first video capture device and digitizing the video sequence from the source; and storing the adjusted video level settings as differential settings with respect to the default settings for the first video capture device.

2. The process of claim 1, wherein the step of storing comprises the step of:

comparing the adjusted video level settings to default settings for the first video capture device to determine the differential settings.

3. The process of claim 2, further comprising the steps of:

setting video level settings of the second video capture device using the differential settings of the first capture device and default settings for the second video capture device; and digitizing the video sequence from the source.

4. The process of claim 3, wherein the step of setting comprises the steps of:

reading the default settings for the second video capture device;

adding the differential settings to the default settings for the second video capture device to obtain a sum; and setting the video level settings of the second video capture device to the sum of the differential settings and default settings.

5. The process of claim 4, further comprising:

the step of scaling the differential settings according to a difference in range of video level settings between the first video capture device and the second video capture device; and wherein the step of adding comprises adding the scaled differential settings and the default settings of the second video capture device.

6. The process of claim 5, wherein the video level settings include a gain setting, a black setting, a saturation setting and a hue setting for a composite analog input signal.

7. An apparatus for digitizing video from a source using a first video capture device to support maintenance of consistent levels of video characteristics when the source is redigitized on a second video capture device, comprising:

means enabling a user to adjust video level settings having default settings on the first video capture device;

means for causing the first video capture device to digitize the video sequence from the to source using the adjusted video level settings; and means for storing the adjusted video level settings as differential settings with respect to the default settings for the first video capture device.

8. The apparatus of claim 7, wherein the means for storing comprises:

means for comparing the adjusted video level settings to default settings for the first video capture device to determine the differential settings.

9. The apparatus of claim 8, further comprising:

means for setting video level settings of the second video capture device using the differential settings and default settings for the second video capture device to provide consistent video level settings; and means for causing the second video capture device to digitize the video sequence from the source using the consistent video level settings.

10. The apparatus of claim 9, wherein the means for setting comprises:

means for reading the default settings for the second video capture device;

means for adding the differential settings to the default settings for the second video capture device to obtain a sum; and means for setting the video level settings of the second video capture device to the sum of the differential settings and default settings.

11. The apparatus of claim 10, further comprising:

means for scaling the differential settings according to a difference in range of video level settings between the first video capture device and the second video capture device; and wherein the means for adding comprises means for adding the scaled differential settings It values of the second video capture device.

12. The apparatus of claim 11, wherein the video level settings include a gain setting, a black setting, a saturation setting and a hue setting for a composite analog input signal.

13. A process for redigitizing video while maintaining consistent levels of video characteristics of the video as digitized with a first video capture device, using a second video capture device, comprising the steps of:

receiving video level settings as differential settings with respect to default settings for the first video capture device;

setting video level settings of the second video capture device using the differential settings and default settings for the second video capture device; and digitizing the video sequence using the second video capture device.

14. The process of claim 13, wherein the step of setting comprises the steps of:

reading the default settings for the second video capture device;

adding the differential settings to the default settings for the second video capture device to obtain a sum; and setting the video level settings of the second video capture device to the sum of the differential settings and default settings.

15. The process of claim 14, further comprising:

the step of scaling the differential settings according to a difference in range of video level settings between the first video capture device and the second video capture device; and wherein the step of adding comprises adding the scaled differential settings and the default settings of the second video capture device.

16. The process of claim 15, wherein the video level settings include a gain setting, a black setting, a saturation setting and a hue setting.

17. An apparatus for redigitizing video while maintaining consistent levels of video characteristics of the video as digitized with a first video capture device, using a second video capture device, comprising:

means for receiving adjusted video level settings as differential settings with respect to the default settings for the first video capture device;

means for setting video level settings of the second video capture device using the differential settings and default settings for the second video capture device to provide consistent video level settings; and means for causing the second video capture device to digitize the video sequence using the consistent video level settings.

18. The apparatus of claim 17, wherein the means for setting comprises:

means for reading the default settings for the second video capture device;

means for adding the differential settings to the default settings for the second video capture device to obtain a sum; and means for setting the video level settings of the second video capture device to the sum of the differential settings and default settings.

19. The apparatus of claim 18, further comprising:

means for scaling the differential settings according to a difference in range of video level settings between the first video capture device and the second video capture device; and wherein the means for adding comprises means for adding the scaled differential settings and the default settings of the second video capture device.

20. The apparatus of claim 19, wherein the video level settings include a gain setting, a black setting, a saturation setting and a hue setting.

* * * * *